United States Patent
Taniguchi et al.

(10) Patent No.: US 9,878,269 B2
(45) Date of Patent: Jan. 30, 2018

(54) FRESH WATER GENERATION METHOD

(75) Inventors: Masahide Taniguchi, Otsu (JP); Tomohiro Maeda, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 157 days.

(21) Appl. No.: 14/239,911

(22) PCT Filed: Aug. 21, 2012

(86) PCT No.: PCT/JP2012/071035
§ 371 (c)(1),
(2), (4) Date: Feb. 20, 2014

(87) PCT Pub. No.: WO2013/027713
PCT Pub. Date: Feb. 28, 2013

(65) Prior Publication Data
US 2014/0190909 A1 Jul. 10, 2014

(30) Foreign Application Priority Data
Aug. 24, 2011 (JP) .................................. 2011-182206

(51) Int. Cl.
*B01D 21/24* (2006.01)
*B01D 21/02* (2006.01)
(Continued)

(52) U.S. Cl.
CPC ......... *B01D 21/2416* (2013.01); *B01D 36/04* (2013.01); *B01D 61/10* (2013.01);
(Continued)

(58) Field of Classification Search
CPC .... C02F 1/00; C02F 1/001; C02F 1/24; C02F 1/38; C02F 3/00; C02F 9/00;
(Continued)

(56) References Cited

U.S. PATENT DOCUMENTS 4,416,786 A * 11/1983 Knorre .................... C02F 1/722
210/746
4,608,179 A * 8/1986 Deal .................. B01D 21/0009
204/571

(Continued)

FOREIGN PATENT DOCUMENTS

CN 100475718 4/2009
CN 102015546 4/2011
(Continued)

OTHER PUBLICATIONS

Yoshinari Fusaoka, "Example in Trinidad and Tobago", Bulletin of the Society of Sea Water Science, Japan, Jun. 1, 2004, vol. 58, No. 3, pp. 264-267 with partial English Translation.
(Continued)

*Primary Examiner* — Joseph Drodge
(74) *Attorney, Agent, or Firm* — RatnerPrestia (57) ABSTRACT

A fresh water generation method by which product water satisfying target water quality can be stably and efficiently obtained even when raw water quality fluctuates, is provided by branching at least a part of a water flow line through which raw water 1 flows into a plurality of branch lines including a branch line A1 and a branch line A2 and differentiating retention times from branching to joining together between the branch line A1 and the branch line A2, in a fresh water generation method for obtaining product water by treating raw water 1.

8 Claims, 4 Drawing Sheets

(51) Int. Cl.

| | | |
|---|---|---|
| C02F 1/00 | (2006.01) | |
| C02F 1/44 | (2006.01) | |
| B01D 61/10 | (2006.01) | |
| B01D 36/04 | (2006.01) | |
| C02F 3/12 | (2006.01) | |
| C02F 103/00 | (2006.01) | |

(52) U.S. Cl.
CPC ............... *C02F 1/00* (2013.01); *C02F 1/006* (2013.01); *C02F 1/441* (2013.01); *B01D 21/02* (2013.01); *C02F 3/1273* (2013.01); *C02F 2103/007* (2013.01); *C02F 2209/001* (2013.01); *C02F 2209/08* (2013.01); *C02F 2209/20* (2013.01); *Y02W 10/15* (2015.05)

(58) Field of Classification Search
CPC .............. C02F 2301/00; C02F 2301/02; C02F 2301/04; C02F 2301/08; C02F 1/44; C02F 1/441; C02F 1/006; C02F 1/28; C02F 2103/007; C02F 2301/043; C02F 2209/001; C02F 2209/08; C02F 2209/20; C02F 1/008; C02F 5/00; C02F 1/442; C02F 1/444; C02F 2209/44; B01D 21/00; B01D 21/0003; B01D 21/0006; B01D 21/0012; B01D 21/0015; B01D 21/02; B01D 21/30; B01D 37/00; B01D 37/04; B01D 15/1871; B01D 24/007; B01D 27/146; B01D 29/0052; B01D 29/56; B01D 33/41; B01D 46/0023; B01D 2317/00; B01D 2317/02; B01D 21/24; B01D 21/2416; B01D 61/02; B01D 61/04; B01D 61/58; B01D 2311/04; B01D 2311/26; B01D 2311/2626; B01D 61/06; B01D 61/10; B01D 61/16; B01D 61/20; B01D 36/00; B01D 36/02; B01D 36/04; B01D 2311/2642; B01D 2311/2646; B01D 2311/2649; B01D 21/245; B01D 21/2444
USPC ....... 210/631, 739, 259, 638, 652, 663, 669, 210/790, 804, 806
See application file for complete search history.

(56) References Cited

U.S. PATENT DOCUMENTS

| | | | | |
|---|---|---|---|---|
| 5,342,523 | A | | 8/1994 | Kuwashima |
| 5,385,664 | A | * | 1/1995 | Oinuma ............... B01D 61/022 210/151 |
| 5,547,584 | A | * | 8/1996 | Capehart ................ C02F 1/008 210/241 |
| 5,558,775 | A | * | 9/1996 | Busch, Jr. .............. B01D 61/04 210/241 |
| 6,241,896 | B1 | * | 6/2001 | La Fargue, Jr. ...... C02F 1/5209 210/143 |
| 6,379,548 | B1 | * | 4/2002 | Kurokawa ............. B01D 61/04 210/207 |
| 7,144,508 | B2 | | 12/2006 | Isaka |
| 8,070,953 | B2 | | 12/2011 | Ito |
| 8,486,275 | B2 | * | 7/2013 | Wolf ........................ C02F 9/00 210/241 |
| 2005/0211629 | A1 | | 9/2005 | Isaka et al. |
| 2006/0249454 | A1 | * | 11/2006 | Staschik ................... C02F 3/06 210/631 |
| 2007/0163958 | A1 | * | 7/2007 | Newcombe ............. C02F 1/004 210/650 |
| 2008/0308475 | A1 | | 12/2008 | Ito et al. |
| 2009/0084733 | A1 | * | 4/2009 | Dietz ...................... C02F 1/725 210/722 |
| 2009/0149571 | A1 | * | 6/2009 | Lux ......................... C02F 11/10 523/129 |
| 2010/0255562 | A1 | * | 10/2010 | Kang ........................ C02F 9/00 435/262 |
| 2011/0042306 | A1 | | 2/2011 | Ito et al. |
| 2011/0062081 | A1 | * | 3/2011 | Daines-Martinez ...... C02F 1/44 210/636 |

FOREIGN PATENT DOCUMENTS

| | | |
|---|---|---|
| JP | 5794389 | 6/1982 |
| JP | 5337488 | 12/1993 |
| JP | 06-218390 | 8/1994 |
| JP | 3270211 | 1/2002 |
| JP | 200458026 | 2/2004 |
| JP | 2004-313923 | 11/2004 |
| JP | 2005-305410 | 11/2005 |
| JP | 2008-307487 | 12/2008 |
| WO | WO 2011/021420 A1 | 2/2011 |
| WO | WO 2011/077815 A1 | 6/2011 |

OTHER PUBLICATIONS

International Search Report for International Application No. PCT/JP2012/071035 dated Nov. 27, 2012.
Supplementary European Search Report dated Oct. 22, 2014, application No. EP 12 82 6357.
Chinese Office Action dated Dec. 15, 2014, application No. 201280041111.6.
Singapore Written Opinion dated Feb. 24, 2015 in Singapore Application No. 2014011795.
Chinese Office Action dated Aug. 5, 2015 for Chinese Application No. 201280041111.6, including English translation.
Singapore Written Opinion dated Aug. 18, 2015 in application No. 2014011795.
Japanese Office Action with partial translation for Application No. 2012539528, dated Aug. 23, 2016, 7 pages.
Japanese Office Action with translation for Japanese Patent Application No. 2012-539528, dated May 17, 2016, 11 pages.
European Office Action for Application No. 12 826 357.1, dated Jun. 20, 2017, 5 pages.

* cited by examiner

FRESH WATER GENERATION METHOD

CROSS REFERENCE TO RELATED APPLICATIONS

This is the U.S. National Phase application of PCT/JP2012/071035, filed Aug. 21, 2012, which claims priority to Japanese Patent Application No. 2011-182206, filed Aug. 24, 2011, the disclosures of each of these applications being incorporated herein by reference in their entireties for all purposes.

FIELD OF THE INVENTION

The present invention relates to a fresh water generation method for obtaining product water by treating raw water such as seawater, river water, groundwater or treated wastewater, and more particularly relates to a fresh water generation method which can efficiently treat raw water, depending on fluctuations in concentration of the raw water.

BACKGROUND OF THE INVENTION

In recent years, depletion of water resources has become serious, and use of water resources which have not hitherto been utilized is being studied. In particular, technology for producing drinking water from seawater which is most familiar and cannot be utilized as it is, so-called "seawater desalination", is attracting attention. The seawater desalination has conventionally been put to practical use mainly by evaporation methods in the Middle East region which is extremely poor in water resources and very rich in thermal resources due to petroleum. However, in regions other than the Middle East, which are not rich in thermal resources, reverse osmosis methods have been adopted due to high energy efficiency, and many plants have been constructed and practically operated in such the Caribbean and the Mediterranean areas. Recently, improvement of reliability and cost reduction due to technical progress of the reverse osmosis methods proceed, and many seawater desalination plants utilizing reverse osmosis technology have been constructed also in the Middle East and have shown global expansion into Asia, Africa, Oceania and Central and South America.

It is preferred that the raw water subjected to the seawater desalination plant is taken from a place as far away from a coast as possible, from the viewpoint of its clarity and reduced environmental impact. In the case of a shoal, the length of an intake pipeline must be longer, so that cost problems tend to occur. When complicated like a bay, clear seawater suitable for the seawater desalination is not obtained in some cases even when the length of the intake pipeline is longer. For this reason, it is not uncommon to take the water from the vicinity of the coast. However, when there is a river in the vicinity of an intake point, fresh water from the river tends to flow in, and moreover, the ratio thereof largely fluctuates according to the ebb and flow of the tide, rain fall or the like. For example, a seawater desalination plant in Trinidad and Tobago is affected by a large river, and the salt concentration of raw water fluctuates from 1.5% to 3.5% (Non-Patent Document 1). The fluctuations in concentration of the raw water leads to fluctuation in osmotic pressure, that is to say, fluctuations in operating pressure, so that it has become necessary to appropriately adjust the output of a pump.

In order to fluctuate the output of the pump, attaching a flow rate regulation valve to a discharge portion of the pump or regulation with an inverter is commonly selected. However, the former cannot avoid energy loss due to pressure loss, although it is simple and low in cost. The latter leads to an increase in equipment cost, and it becomes a costly large restriction to attach the inverter to a large pump applied to a huge seawater desalination plant which has recently continued to increase, although it can suppress the energy loss.

Further, frequent fluctuations of operating pressure results in continuing to give stress to pipelines, valves and reverse osmosis membranes, and also results in accelerating fatigue of materials. This is therefore not a preferred situation.

Furthermore, fluctuations of raw water concentration results in fluctuations of product water quality. From the viewpoint of product water quality, it becomes necessary to perform designing based on the most severe case, so that the plant is overengineered in many cases. Methods for solving this include recirculating of concentrate in the case where the raw water concentration is low as shown in Patent Document 1 and recirculating of product water which does not satisfy the water quality as shown in Patent Document 2. However, circulation reprocessing leads to a decrease in product water amount and an increase in operating cost.

Measures which can reduce the changes in concentration include a method of installing a raw water storage tank. However, only the installation of the water storage tank results in relying on natural retention, and moreover, water flow is one-way from an inlet to an outlet. Accordingly, the concentration cannot be homogenized so much. When stirring is performed with the installation of the raw water storage tank, the concentration can be homogenized. However, this requires stirring energy, and is not practical in terms of energy and equipment, particularly in a huge plant.

PATENT DOCUMENT

Patent Document 1: Japanese Patent No. 3270211
Patent Document 2: JP-A-2008-307487

NON-PATENT DOCUMENT

Non-Patent Document 1: Yoshinari Fusaoka, "Example in Trinidad and Tobago", Bulletin of the Society of Sea Water Science, Japan, Jun. 1, 2004, vol. 58, No. 3, pp. 264-267

SUMMARY OF THE INVENTION

The invention provides a fresh water generation method by which product water satisfying target water quality can be stably and efficiently obtained at low cost, even when raw water quality fluctuates.

In order to solve the above-mentioned problems, the invention has the following aspects:

(1) A fresh water generation method for obtaining product water by treating raw water, the method including branching at least a part of a water flow line through which raw water flows into a plurality of branch lines including a branch line A1 and a branch line A2 and differentiating retention times from branching to joining together between the branch line A1 and the branch line A2.

(2) The fresh water generation method according to (1), in which a volume of the branch line A1 is differentiated from a volume of the branch line A2.

(3) The fresh water generation method according to (1) or (2), in which a feed flow rate to the branch line A1 is made to be substantially equivalent to a feed flow rate to the branch line A2.

(4) The fresh water generation method according to any one of (1) to (3), in which the branch line A1 and the branch line A2 have a function of sedimentation separation.

(5) The fresh water generation method according to any one of (1) to (4), in which the raw water is fed to the branch line A1 and the branch line A2 substantially at the same time.

(6) The fresh water generation method according to any one of (1) to (5), in which the retention times after branched are differentiated between the branch line A1 and the branch line A2, and thereafter a treatment is performed with a pretreatment unit in each branch line of the branch line A1 and the branch line A2, followed by joining together.

(7) The fresh water generation method according to any one of (1) to (6), in which a difference between the retention time in the branch line A1 and the retention time in the branch line A2 is from 4 hours to 8.5 hours.

(8) The fresh water generation method according to any one of (1) to (6), in which the branch lines comprise n lines (with the proviso that n is a natural number of 3 or more), and a difference in retention time between the different lines is from $8/n$ hours to $17/n$ hours, or from $8-8/n$ hours to $17-17/n$ hours.

(9) The fresh water generation method according to any one of (1) to (8), in which fresh water is produced using the raw water joined together from the plurality of branch lines.

(10) The fresh water generation method according to any one of (1) to (8), in which biological treatment is performed using the raw water joined together from the plurality of branch lines.

(11) The fresh water generation method according to any one of (1) to (10), in which a total salt concentration of the raw water fluctuates twice or more for one year.

(12) The fresh water generation method according to any one of (1) to (11), in which raw water quality is measured at the time of feeding the raw water to the branch line A1 and the branch line A2, when the raw water quality satisfies predetermined conditions, the raw water is taken, and when the raw water quality does not satisfy the conditions, the raw water is fed to neither the branch line A1 nor the branch line A2.

According to the invention, it becomes possible to stably and efficiently obtain product water satisfying target water quality, even when raw water quality fluctuates.

DETAILED DESCRIPTION OF EMBODIMENTS OF THE INVENTION

Preferred embodiments of the invention will be described below using the drawings. However, it should be understood that the scope of the invention is not limited thereby.

Figure 1:
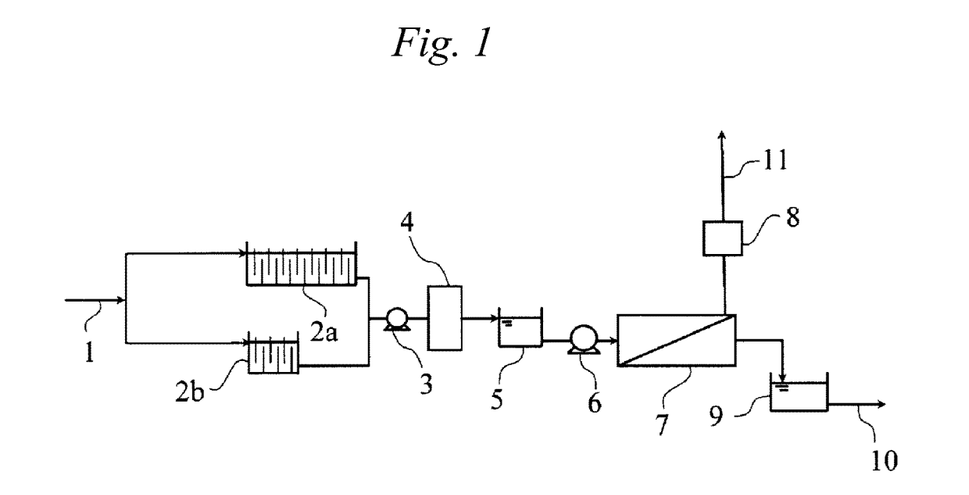
FIG. 1 is a schematic flow diagram showing one embodiment of a water treatment apparatus for seawater desalination according to a fresh water generation method of the invention, which is provided with sedimentation tanks as branch lines.

As one example of a water treatment apparatus according to a fresh water generation method of the invention, seawater desalination reverse osmosis membrane apparatus in which raw water is branched into two lines is shown in FIG. 1. In the water treatment apparatus shown in FIG. 1, raw water 1 is branched into sedimentation tanks 2a and 2b, and thereafter, allowed to join together. Then, it is fed to a pretreatment unit 4 by a pretreatment feed pump 3 and treated therein, and the pretreated raw water is fed to a reverse osmosis membrane unit 7 by a booster pump 6 through an intermediate water tank 5. Permeate of the reverse osmosis membrane unit 7 is stored in a product water tank 9, and used through a water distributing line 10. Concentrate of the reverse osmosis membrane unit 7 is discharged to the outside of the system from a discharging line 11 after recovering pressure energy through an energy recovery unit 8.

Here, general separation treatment such as solid-liquid separation or adsorption separation can be applied as the pretreatment unit 4. As the solid-liquid separation particularly suitable for the pretreatment of seawater desalination, a screen filter for removing milli-order matters, sand filtration or filter cloth for removing micron-order matters, a microfiltration membrane or an ultrafiltration membrane capable of removing submicron matters, a nanofiltration membrane capable of performing more precise filtration, and the like may be mentioned. In addition, it is also possible to efficiently remove organic matters and the like by applying a coagulant or an adsorbent, or using a coagulant or an adsorbent in combination with solid-liquid separation.

This example has a constitution that a difference in retention time occurs between the sedimentation tanks 2a and 2b. The present example is characterized in that at least a part of a water flow line through which raw water flows is branched into a plurality of branch lines, and that the retention times thereof from branching to joining together are differentiated from each other [the embodiment of the above (1)]. There is no limitation on a method for differentiating the retention times. For example, when the feed flow rates to the respective branch lines are the same, it is only necessary to differentiate the volumes of the branch lines [the embodiment of the above (2)]. In addition, this can also be realized by changing the flow path lengths of the branch lines, the flow path widths thereof or the number of units. However, in order to equalize the fluctuations in the raw water quality, which is an aspect of the invention, the difference D in retention time is set to at least one tenth of a water fluctuation cycle C to 10 times thereof. When the water quality fluctuation cycle C is constant to a certain level, water discharged from sedimentation tanks 2a and 2b is on an opposite phase of the water quality fluctuation cycle. That is to say, the difference in retention time is adjusted to a half of the water quality fluctuation cycle. Even in the case where the water quality fluctuation cycle C is irregular, it is possible to achieve the gist of the invention by grasping an approximate minimum water quality fluctuation cycle and setting the difference in retention time of one tenth to 10 times thereof.

Figure 5:
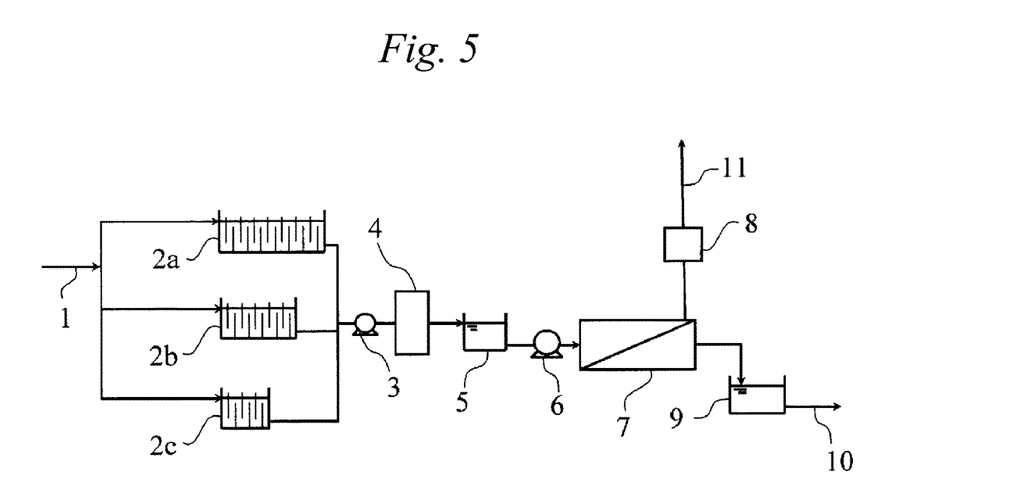
FIG. 5 is a schematic flow diagram showing one embodiment of a water treatment apparatus for seawater desalination according to a fresh water generation method of the invention, which has three branch lines.

For example, when seawater near a river mouth is used as the raw water, fluctuations in sea level caused by tide have a great influence. Accordingly, in consideration of the fluctuations around a tidal cycle, namely 6.25 hours, approximately a half of 12.5 hours, the difference D in retention time is preferably set to from 4 hours to 8.5 hours, and more preferably set to from 5 hours to 7.5 hours [the embodiment of the above (7)]. Further, although there is also no particular limitation on the flow rates fed to the sedimentation tanks 2a and 2b, it is possible to most minimize raw water fluctuations by making them to be substantially equivalent [the embodiment of the above (3)]. Incidentally, in FIG. 1, the sedimentation tanks 2 for changing the retention time are provided in two lines. However, it is also a preferred embodiment to provide them in 3 lines or more, as exemplified in FIG. 5. When provided in n lines (with the proviso that n is a natural number of 3 or more), the difference D in retention time between the different lines is preferably set to (1/n) times or (1-1/n) times the water quality fluctuation cycle C. That is to say, more specifically, when seawater near a river mouth is used as the raw water, the difference D in retention time between the different lines is preferably set to from 8/n hours to 17/n hours, or from 8-8/n hours to 17-17/n hours [the embodiment of the above (8)].

In the water treatment apparatus of FIG. 1, the sedimentation tanks 2a and 2b are used as a means for differentiating the retention time. It is preferred that the branch lines in the present invention have a function of sedimentation separation like this example [the embodiment of the above (4)]. The ones having the function of sedimentation separation are roughly classified into gravity-driven sedimentation tanks in which sedimentation is performed simply by gravity and coagulation sedimentation tanks in which sedimentation is accelerated by addition of a coagulant. Further, in order to increase the sedimentation velocity or the sedimentation area, it is also possible to apply an inclined plate to each of them.

Figure 2:
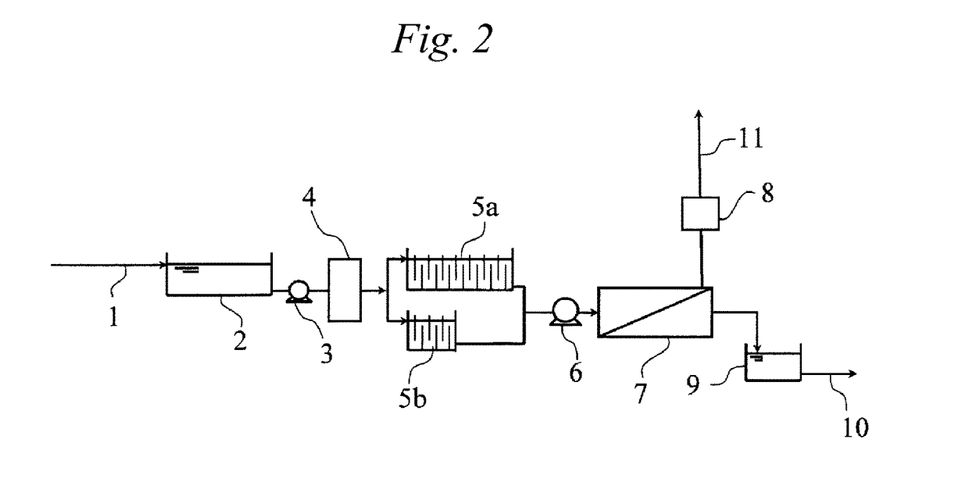
FIG. 2 is a schematic flow diagram showing one embodiment of a water treatment apparatus for seawater desalination according to a fresh water generation method of the invention, which is provided with intermediate water tanks as branch lines.
Figure 3:
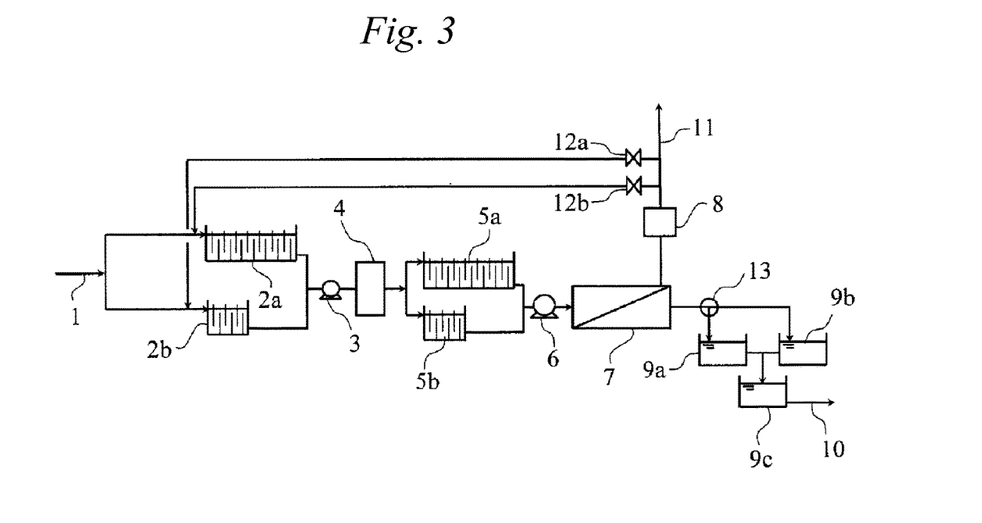
FIG. 3 is a schematic flow diagram showing one embodiment of a water treatment apparatus for seawater desalination according to a fresh water generation method of the invention, which is provided with a sedimentation tank and an intermediate water tank as branch lines.

Furthermore, in FIG. 1, the difference in retention time is provided between the sedimentation tanks 2a and 2b. In order to achieve benefits of the invention, for example, the water can also be taken from originally different positions, or the pipeline lengths of water intake lines to the sedimentation tanks 2a and 2b can also be changed. However, in order to provide the necessary difference in retention time, the pipeline length of the water intake line becomes considerably long. It is therefore preferred that the raw water feed lines to the sedimentation tanks 2a and 2b are made common, and that the volume can be inexpensively and sufficiently possessed, like water tanks, as in FIG. 1. That is to say, it is preferred to feed the raw water to the respective branch lines substantially at the same time [the embodiment of the above (5)]. From this viewpoint, in FIG. 1, that function is given to the sedimentation tanks 2a and 2b. However, the function can also be given to intermediate water tanks 5a and 5b as shown in FIG. 2, or to both sedimentation tanks 2a and 2b and intermediate water tanks 5a and 5b as shown in FIG. 3. However, when fluctuating raw water 1 is treated with pretreatment unit 4 as in FIG. 2, the load on the pretreatment unit 4 fluctuates by fluctuations in water quality of the raw water 1. Accordingly, when a situation where fluctuations in the load on the pretreatment unit 4 are large to cause operation difficulty is assumed, it is unfavorable to give the function of providing the difference in retention time to the intermediate water tanks 5a and 5b instead of the sedimentation tanks 2a and 2b. However, when the pretreatment unit 4 is designed so as to withstand the fluctuations in the load, conversely, environmental changes of the pretreatment unit 4 become large, leading to risk reduction of the propagation of living organisms. It is therefore a preferred embodiment to give the function of providing the difference in retention time to both the sedimentation tanks 2a and 2b and the intermediate water tanks 5a and 5b.

Further, in the case having the function of providing the plural differences in retention time, like the sedimentation tanks and the intermediate water tanks as shown in FIG. 3, the total of the respective differences in retention time of the sedimentation tanks 2a and 2b and the intermediate water tanks 5a and 5b is set preferably to from 4 hours to 8.5 hours and more preferably to from 5 hours to 7.5 hours, as the difference in retention time. In particular, when the branched flow rates are different, it is not easy to homogenize the raw water quality by one difference in retention time. Accordingly, the method of giving the function of providing the difference in retention time to both the sedimentation tanks 2a and 2b and the intermediate water tanks 5a and 5b shown in FIG. 3 is extremely effective.

Figure 4:
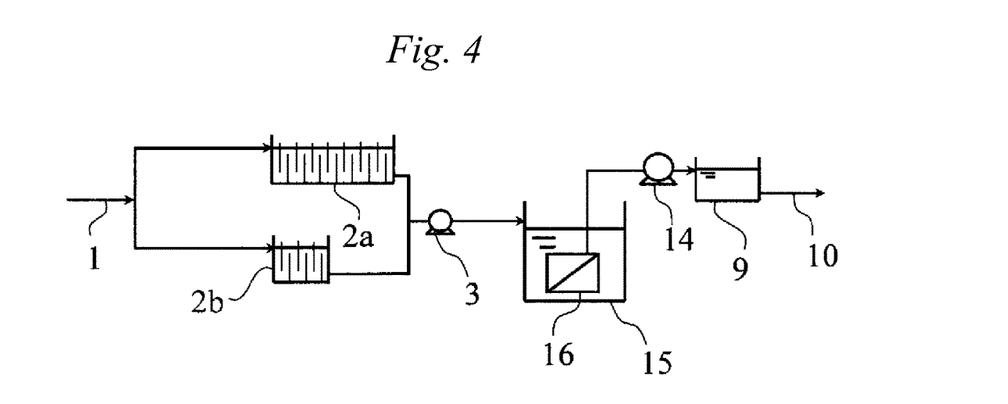
FIG. 4 is a schematic flow diagram showing one embodiment of a biological treatment apparatus according to a fresh water generation method of the invention, which is provided with sedimentation tanks as branch lines.

The water in which the fluctuations in raw water quality are suppressed according to the present invention can be subjected to various treatments in later stages. In particular, it is suitable to produce fresh water with reverse osmosis membrane water treatment apparatus in which operating pressure or product water quality fluctuates by the raw water concentration as exemplified in FIG. 1, especially by seawater desalination in which fluctuations in osmosis pressure are large and fluctuations in product water quality are also large [the embodiment of the above (9)]. Further, this is also suitable for biological treatment in which stable treatment becomes difficult by the fluctuations in raw water quality [the embodiment of the above (10)]. A membrane bioreactor involving the biological treatment is exemplified in FIG. 4.

By the way, as the raw water suitable for the present invention, suitable is one in which the fluctuations in water quality having influences on operating conditions or the product water quality are large. The present invention is also suitable for treatment of seawater having a high salt concentration as described above or brine water, and suitable for treatment of sewage wastewater or the like having large fluctuations not only in salt concentration, but also in organic matter concentration. Specifically, when the total salt concentration of the raw water fluctuates twice or more for one year, the present invention can be suitably utilized [the embodiment of the above (11)]. Further, also when the concentration of organic matter in the raw water fluctuates twice or more for one year, the present invention can be suitably utilized. Here, for the fluctuation widths of the total salt concentration and the organic matter concentration, the maximum values and minimum values thereof are defined by the maximum values and minimum values of the total salt concentration and the like obtained by monitoring the raw water quality for one year. In the present invention, it is preferred that the ratio of the maximum value and minimum value thereof is 2 or more. Incidentally, as a measuring method of the total salt concentration of the raw water, there is exemplified a measuring method using the "total dissolved solid" concentration, in which the raw water is evaporated to dryness and the weight thereof is measured, or use of simply a conductance meter and a salinometer for converting it to the salt concentration. Further, as a measuring method of the organic matter concentration, the most common is a measuring method using TOC (total organic carbon) concentration as an index. However, in addition, there are exemplified measuring methods using COD (chemical oxygen demand), BOD (biological oxygen demand), UV (ultraviolet absorption), IR (infrared absorption) and GC-MS (gas chromatograph mass spectrometry) as indices.

Further, in order to make the present invention more effective, it is also preferred to measure the raw water quality at the time of feeding the raw water and to take the water when the raw water quality satisfies predetermined conditions [the embodiment of the above (12)]. As the water quality as used herein, there is exemplified one having great influences on operating conditions of membrane separation in a later stage as described above. For example, in the case of the reverse osmosis membrane, there is exemplified the total salt concentration giving large fluctuations to the osmotic pressure, and in the case of the membrane bioreactor, there is exemplified the organic matter concentration or total salt concentration having great influences on biological activity or treatment efficiency. It is preferred to perform control so as to take the water when these raw water qualities are within the predetermined ranges.

For example, when the raw water is seawater (total salt concentration: 1.5 to 3.5%) near a river mouth as described in the above-mentioned Non-Patent Document 1, the osmotic pressure is reduced by 5 to 10 bar compared to the case of a total salt concentration of 3.5% by not taking seawater having a total salt concentration of 2.5% or more. It is therefore possible to reduce necessary specs of the booster pump, which also leads to a reduction in pressure (a reduction in required power) at the time of operation. This makes it easy to suppress the fluctuations in raw water concentration, which is an aspect of the present invention, and therefore is very preferred. However, when the threshold value is narrowed, the water intake available time is shortened. Accordingly, ability of an intake pump is increased, so that it is necessary to consider a cost balance. Incidentally, when this method is applied in the case where the seawater near a river mouth is used as the raw water, for example, a part of fluctuations in sea level caused by tide are not taken. Accordingly, the cycle with respect to the water intake becomes shorter than 12.5 hours, so that it is preferred to make shorter than "approximately a half of 12.5 hours" described above. Specifically, when the water intake available time per day is T hours, the difference D in retention time is preferably set to approximately C×T/48 (for example, in the case of T=12 hours, from 6 hours to 6.5 hours). Of course, it is also a preferred embodiment to provide the sedimentation tanks 2 and the like for changing the retention time in 3 lines or more. In the case of n lines, it is preferred to set the difference D in retention time to T/24/n times or T/24×(1-1/n) times the water quality fluctuation cycle C.

Further, when the concentration of concentrate of the reverse osmosis membrane unit 7 is smaller than the concentration of the raw water 1 at the time of inflow, it is also possible to recirculate the concentrate by opening valves 12a and 12b, as exemplified in FIG. 3. In FIG. 3, the concentrate is recirculated to before the sedimentation tanks 2a and 2b. However, it may be recirculated to after the sedimentation tanks 2a and 2b or to before and after the intermediate water tanks 5a and 5b. Further, from the viewpoint of suppressing fluctuations in product water quality, it is also preferred to install the product water tanks 9 as product water tanks 9a, 9b and 9c in a cascade form and to control a three-way valve 13 for the fluctuations in product water quality, thereby suppressing the fluctuations, as exemplified in FIG. 3. Specifically, for example, the average concentration of 9a and 9b can be obtained by periodical switching to the product water tanks 9a and 9b and storing therein to decrease the difference in concentration between product water tank 9a and 9b, followed by mixing thereof in 9c.

Figure 6:
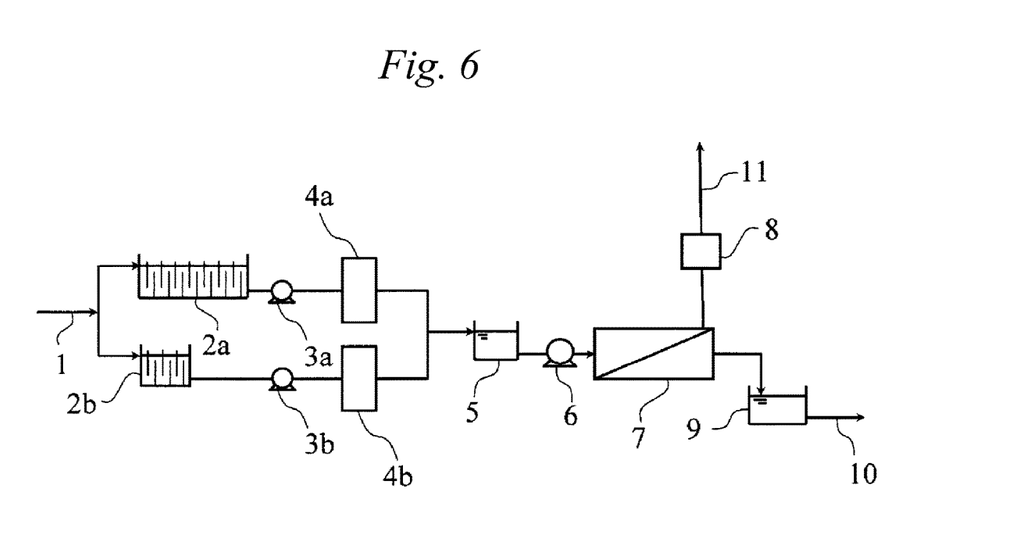
FIG. 6 is a schematic flow diagram showing one embodiment of a water treatment apparatus for seawater desalination according to a fresh water generation method of the invention, which has a pretreatment unit in each branch line.
Figure 7:
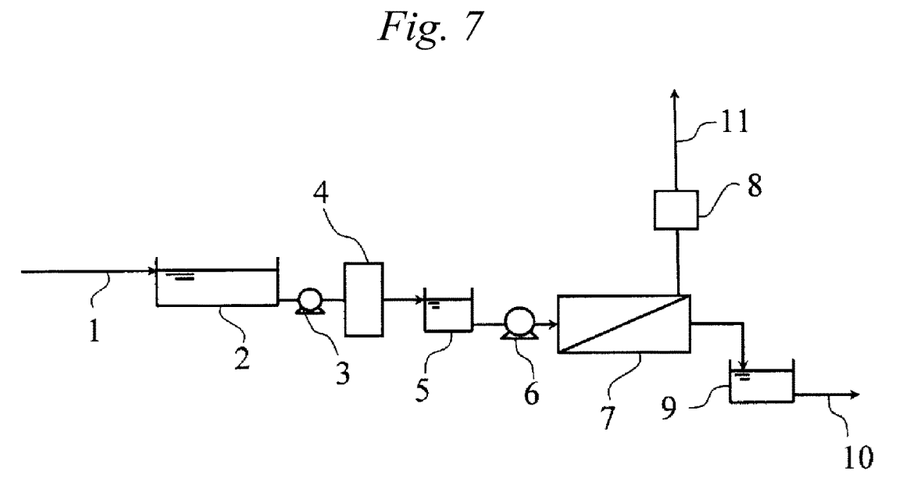
FIG. 7 is a flow diagram of a conventional water treatment apparatus for seawater desalination.

Further, in the present invention, the water stabilized in water quality after branched and mixed can also be treated with the pretreatment unit 4, as shown in FIG. 1, and the water can also be treated with the pretreatment unit 4 before branched, as shown in FIG. 2. Furthermore, as exemplified in FIG. 6, it is also preferred to shift the retention time of water after branched using sedimentation tanks 2a and 2b and to independently pretreat each using pretreatment units 4a and 4b, followed by mixing. The load on the pretreatment unit can be dispersed by adopting this method, because of the difference in water quality between the pretreatment units 4a and 4b. That is to say, when the load is largely applied on 4a, it becomes possible to decrease the load on 4b. This is therefore a preferred embodiment [the embodiment of the above (6)].

The present invention can be utilized in a fresh water generation method for stably and efficiently obtaining product water satisfying target water quality by treating raw water such as seawater, river water, groundwater or treated wastewater.

DESCRIPTION OF REFERENCE NUMERALS AND SIGNS

1: Raw water
2: Sedimentation tank
3: Raw water feed pump
4: Pretreatment unit
5: Intermediate water tank
6: Booster pump
7: Reverse osmosis membrane unit
8: Energy recovery unit
9: Product water tank
10: Water distributing line
11: Discharging line
12: Valve
13: Three-way valve
14: Suction pump
15: Biological treatment water tank
16: Submerged type membrane

The invention claimed is:

1. A fresh water generation method for obtaining product water by treating raw water having a fluctuation in concentration, the method comprising:

branching at least a part of a water flow line through which raw water flows into a plurality of branch lines including a branch line A1 and a branch line A2 wherein the branch line A1 and the branch line A2 comprise sedimentation tanks downstream of the branching and wherein the raw water is fed to the branch line A1 and the branch line A2 substantially at the same time, followed by joining together the branch line A1 and the branch line A2, wherein a volume contained in the branch line A1 differs from a volume contained in the branch line A2 such that retention times from branching to joining together between the branch line A1 and the branch line A2 differ;

performing a pretreatment of the raw water with a solid-liquid separation or an adsorption separation before or after the plurality of branch lines; and optionally treating the joined branch line A1 and the branch line A2 with a reverse osmosis membrane.

2. The fresh water generation method according to claim 1, wherein a feed flow rate of raw water to the branch line A1 is made to be substantially equivalent to a feed flow rate of raw water to the branch line A2.

3. The fresh water generation method according to claim 1, wherein after branching, a treatment is performed with a pretreatment unit in each of the branch line A1 and the branch line A2, followed by joining together the branch line A1 and the branch line A2.

4. The fresh water generation method according to claim 1, wherein a difference between the retention time in the branch line A1 and the retention time in the branch line A2 is from 4 hours to 8.5 hours.

5. The fresh water generation method according to claim 1, wherein the plurality of branch lines comprise n lines (with the proviso that n is a natural number of 3 or more) each having a different retention time, and a difference in retention time between the different lines is from $8/n$ hours to $17/n$ hours, or from $8-8/n$ hours to $17-17/n$ hours.

6. The fresh water generation method according to claim 1, wherein biological treatment is performed using the raw water joined together from the plurality of branch lines.

7. The fresh water generation method according to claim 1, wherein a total salt concentration of the raw water fluctuates twice or more in one year.

8. The fresh water generation method according to claim 1, wherein raw water quality is measured before feeding the raw water to the branch line A1 and the branch line A2, when the raw water quality satisfies predetermined conditions, the raw water is fed to the branch line A1 and the branch line A2, and when the raw water quality does not satisfy the conditions, the raw water is fed to neither the branch line A1 nor the branch line A2.

* * * * *